United States Patent [19]

Chujo et al.

[11] Patent Number: 4,845,186

[45] Date of Patent: Jul. 4, 1989

[54] METHOD FOR PRODUCTION OF MODIFIED POLYESTERS

[75] Inventors: Noboru Chujo; Shigeo Mori, both of Kyoto, Japan

[73] Assignee: Dai-Ichi Kogyo Seiyaku Co., Ltd., Kyoto, Japan

[21] Appl. No.: 283,152

[22] Filed: Dec. 9, 1988

[51] Int. Cl.$^4$ ............................................. C08G 63/04
[52] U.S. Cl. ................................. 528/272; 528/274; 528/277; 528/300; 528/308; 528/308.2; 528/489
[58] Field of Search ............... 528/272, 274, 277, 300, 528/308, 308.2, 489

[56] References Cited

U.S. PATENT DOCUMENTS

| | | |
|---|---|---|
| 3,016,404 | 1/1962 | Beauchamp et al. |
| 3,715,402 | 2/1973 | Louvar et al. |
| 3,833,669 | 9/1974 | Gehm et al. |
| 4,029,879 | 6/1977 | Muzzio ..................................... 536/4 |
| 4,129,718 | 12/1978 | Muzzio ..................................... 536/4 |
| 4,137,398 | 1/1979 | Muzzio ..................................... 536/4 |
| 4,254,287 | 3/1981 | Ziegenhain et al. ................. 568/621 |
| 4,306,943 | 12/1981 | Mori ....................................... 203/29 |
| 4,482,750 | 11/1984 | Hetzel et al. ......................... 568/621 |
| 4,521,548 | 6/1985 | Christen et al. ..................... 521/167 |
| 4,528,364 | 7/1985 | Prier ..................................... 528/370 |

FOREIGN PATENT DOCUMENTS

| | | |
|---|---|---|
| 34-10794 | 12/1959 | Japan. |
| 52-63292 | 5/1977 | Japan. |
| 62-104971 | 5/1987 | Japan. |
| 62-37048 | 8/1987 | Japan. |

*Primary Examiner*—John Kight
*Assistant Examiner*—S. A. Acquah
*Attorney, Agent, or Firm*—Jordan and Hamburg

[57] ABSTRACT

This invention relates to a method of producing a modified polyester having high fiber whiteness and satisfactory dyeability. In producing a polyester at least 80% of whose repeating structural units are ethylene terephthalate units, at least one specified polyalkylene glycol having a potassium and sodium content not more than 3 ppm and an average molecular weight not less than 400 is added for copolymerization. The method enables production of a polyester with a high degree of whiteness and, moreover, a polyester with excellent static-proofness and dyeability.

1 Claim, No Drawings

METHOD FOR PRODUCTION OF MODIFIED POLYESTERS

BACKGROUND OF THE INVENTION

The present invention relates to a method for producing a modified polyester having high fiber whiteness and excellent dyeability.

The well-known method for producing polyesters having superior dyeability comprises copolymerizing ethylene terephthalate with a polyalkylene glycol (Japanese Patent Publication No. 34-10794). However, the polyester manufactured by this method had the disadvantage of poor fiber whiteness.

There was accordingly proposed a method for producing a polyester of high fiber whiteness which comprises subjecting terephthalic acid and ethylene glycol to esterification and polycondensation reactions, with a polyalkylene glycol being added to the reaction system for copolymerization at the stage when the degree of esterification has reached 70% (Japanese Laid-Open Patent Publication KOKAI No. 52-63292).

However, in this method for producing polyesters, it is essential that one should start with terephthalic acid and ethylene glycol and, then, add a polyalkylene glycol at the stage when the degree of esterification has reached at least 70 percent. This requirement caused the following problems.

(1) Process control and control of production conditions are difficult.

(2) The sequence of transesterification reaction between dimethyl terephthalate and ethylene glycol and subsequent condensation reaction does not have any favorable effect on improving fiber whiteness, and furthermore affects spinning tone adversely.

In addition, no satisfactory degree of whiteness can be accomplished by the method.

Therefore, the present inventors conducted a series of experiments and found that salts of potassium and sodium occurring as impurities in the polyalkylene glycol charge exert marked deleterious effects on the whiteness of the product polyester fiber. The present invention is predicated on the above finding.

SUMMARY OF THE INVENTION

It is a primary object of the present invention to provide a modified polyester having high fiber whiteness and excellent dyeability.

In accordance with this invention, a polyester at least 80 percent of its repeating structural units are ethylene terephthalate units is produced by adding at least one member of polyalkylene glycols of the following general formula (I) which has a potassium and sodium content not more than 3 ppm and an average molecular weight not less than 400 to the reaction system for copolymeriation

(I)

wherein R is a $C_{1-26}$ aliphatic or aromatic hydrocarbon group or a hydrogen atom; A is a $C_{2-4}$ alkylene or substituted alkylene group; and m is an integer representing a degree of polymerization.)

DETAILED DESCRIPTION OF THE PREFERRED EMBODIMENT

The polyalkylene glycol of the above general formula (I) (hereinafter referred to simply as polyalkylene glycol), which is used in accordance with this invention, is a compound synthesized by addition reaction between at least one member selected from the group consisting of alcohols, alkylene glycols and hydroxyaromatic compounds and at least one member of the group consisting of alkylene oxides and substituted alkylene oxides (for example, ethylene oxide, propylene oxide, butylene oxide and isobutylene oxide, etc.). Specific examples include polyethylene glycol, methoxypolyethylene glycol, ethoxypolyethylene glycol, propoxypolyethylene glycol, butoxypolyethylene glycol, phenoxypolyethylene glycol, para-t-butylphenoxypolyethylene glycol, polypropylene glycol, methoxypolypropylene glycol, ethoxypolypropylene glycol, phenoxypolypropylene glycol, para-t-butylphenoxypolypropylene glycol, methoxypolybutylene glycol and ethoxypolybutylene glycol.

Such polyalkylene glycol must have a potassium and sodium content not more than 3 ppm. If the potassium and sodium content exceeds 3 ppm, the object of the invention cannot be accomplished.

Heretofore, it was difficult to produce a polyalkylene glycol having a potassium and sodium content of a few ppm. It was because there was available no purification method by which the alkali catalyst added in the synthetic stage could be efficiently removed. Recently, however, an effective purification process was proposed (Japanese Patent Publication No.62-37048, U.S. Pat. No. 4,306,943), whereby the polyalkylene glycol having a potassium and sodium content not more than 3 ppm, which is used in the method of the present invention, can be easily provided.

The potassium and sodium content of the polyalkylene glycol to be used in accordance with this invention is not more than 3 ppm as mentioned before and this is an essential requirement that must be met in order that the whiteness of the product polyester fiber will assume a value of commercial use (Experience tells us that it is not less than 75). The lower the potassium and sodium content of the polyalkylene glycol, the higher and, therefore, more desirable is the whiteness of the product polyester fiber. However, since it is costly to produce a polyalkylene glycol with a potassium and sodium content less than 0.1 ppm, it is not economical to use such a polyalkylene glycol as starting material.

Furthermore, the average molecular weight of the polyalkylene glycol to be used in accordance with the present invention is not less than 400 and preferably in the range of 500 to 20,000. If the average molecular weight is less than 400, the polyalkylene glycol adheres to the equipment or is scattered at reaction under pressure, thus entailing large losses. If the average molecular weight exceeds 20,000, purification becomes difficult.

In the method of producing a modified polyester according to this invention, terephthalic acid or dimethyl terephthalate and ethylene glycol are used as principal starting materials to produce a polyester at least 80% of whose repeating structural units are ethylene terephthalate units and, in this step of synthesis, said polyalkylene glycol is added for copolymerization.

Regarding the level of addition of polyalkylene glycol, the effect of addition is scarce if the level is too low, while an excess of polyalkylene glycol results in an untoward modification of the product polyester, resulting in a loss of fiber strength which is an intrinsic advantage of polyesters. The polyalkylene glycol content of the product polymer is preferably 0.3 to 30 weight percent and more preferably 0.5 to 10 weight percent. In order to produce such a polyester by the direct polymerization process, the polyalkylene glycol is added in a proportion of preferably 0.347–34.7 weight parts and more preferably 0.58–11.6 weight parts to 100 weight parts of terephthalic acid. In the transesterification process, the polyalkylene glycol is added in a proportion of preferably 0.297 to 29.7 weight parts and more preferably 0.495 to 9.9 weight parts to 100 weight parts of dimethyl terephthalate.

If necessary, it is possible to add to the reaction system, in a small amount, a bifunctional monomer such as propylene glycol, neopentyl glycol, tetramethylene glycol, phthalic acid, isophthalic acid, adipic acid, sebacic acid, p-hydroxybenzoic acid, etc.; a polyfunctional crosslinking agent such as trimethylolpropane, pentaerythritol, glycerin, trimesic acid, etc.; or a methyl ester of phthalic acid, isophthalic acid, adipic acid, sebacic acid, p-hydroxybenzoic acid, trimesic acid or the like.

Furthermore, it is also possible to add to the reaction system matting agents such as titanium dioxide, etc., ultraviolet absorbers such as benzophenone compounds, benzotriazole compounds, etc., fluorescent whiteners such as imidazolone compounds, diaminostilbene compounds, benzimidazole compounds, etc., or insoluble nucleating agents such as kaolin and the like. Among those auxiliary agents, fluorescent whiteners contribute to enhanced fiber whiteness of the polyester.

Thus, in accordance with this invention, a polyester fiber having very high whiteness can be produced by adding a specified polyalkylene glycol. Furthermore, even if the specified polyalkylene glycol of the present invention is used in large amounts, it does not happen that the product polyester suffers from coloration to decrease its fiber whiteness. Thus, for attainment of the static-proofness and satisfactory dyeability of the polyester, the level of addition of said polyalkylene glycol can be chosen freely from a broad range.

The following examples and comparative examples are merely intended to illustrate the present invention in further detail and should by no means be considered to be limitative of the scope of the invention.

EXAMPLES 1 to 8 AND COMPARATIVE EXAMPLES 1–8

A reactor equipped with agitator and reflux condenser was charged with 100 weight parts of terephthalic acid, 112 weight parts of ethylene glycol, a predetermined amount of one of various polyalkylene glycols mentioned in Table 1, 0.06 weight part of pentaerythritol, 0.5 weight part of titanium dioxide and 0.06 weight part of antimony trioxide, and the mixture was heated at 197° C in a nitrogen gas stream with stirring for esterification. Thereafter, the reflux condenser was disconnected from the reactor and after the temperature was increased to 285° C. for removal of excess ethylene glycol, the reaction mixture was stirred for 3 hours at the same temperature in a vacuum of 1 mmHg or less for polymerization.

The resulting polymer was withdrawn from the reactor, cooled to solidify, and reduced to chips. The chips were thoroughly dried in a hot current of air at about 180° C. and, then, fed to a melt-spinning apparatus, from which the melt was extruded through a 48-orifice nozzle having an orifice diameter of 0.24 mm. The resulting tow was taken up and stretched in a water bath at 80° C. to give a polyester fiber of 250 D/48 monofilaments. The measured degree of whiteness of this fiber is shown in Table 1.

The potassium and sodium content of polyalkylene glycol and the degree of whiteness of fiber were determined as follows.

(a) Potassium and sodium content of polyalkylene glycol:

Determined with a Hitachi Model 208 atomic absorption spectrophotometer in accordance with JIS K 0102-1981, Flame Photometry.

(b) Fiber whiteness:

According to Hunter's method (proposed by Richard S. Hunter), L and b values were determined with a color-difference meter (Model TC-1500 MD, Tokyo Denshyoku K.K.) and the degree of whiteness was calculated by means of the following equation.

The degree of whiteness $= L - 4 \times b$.

The larger the value, the higher is the degree of whiteness and the more satisfactory is the color tone.

TABLE 1

| Item No. | Polyalkylene glycol Compound | Average molecular weight | Amount of charge (wt. parts) | K & Na content (ppm) | Whiteness of polyester fiber |
| --- | --- | --- | --- | --- | --- |
| Example 1 | Polyethylene glycol | 3000 | 3 | 1.0 | 82 |
| Example 2 | Methoxypolyethylene glycol | 5000 | 3 | 2.3 | 77 |
| Example 3 | Methoxypolyethylene glycol | 1000 | 3 | 1.4 | 81 |
| Example 4 | Phenoxypolyethylene glycol | 3000 | 3 | 0.9 | 79 |
| Example 5 | Phenoxypolypropylene glycol | 8000 | 3 | 1.2 | 80 |
| Example 6 | Methoxypolybutylene glycol | 1000 | 3 | 0.9 | 78 |
| Example 7 | Phenoxypolyethylene glycol | 3000 | 6 | 1.2 | 81 |
| Example 8 | Phenoxypolyethylene glycol | 650 | 4 | 1.6 | 82 |
| Comparative Example 1 | Polyethylene glycol | 3000 | 3 | 4.2 | 65 |
| Comparative Example 2 | Methoxypolyethylene glycol | 5000 | 3 | 5.5 | 60 |
| Comparative Example 3 | Methoxypolyethylene glycol | 1000 | 3 | 4.7 | 62 |
| Comparative Example 4 | Phenoxypolyethylene glycol | 3000 | 3 | 5.6 | 59 |
| Comparative Example 5 | Phenoxypolypropylene glycol | 8000 | 3 | 6.0 | 61 |
| Comparative Example 6 | Methoxypolybutylene glycol | 1000 | 3 | 4.8 | 60 |

TABLE 1-continued

| Item No. | Polyalkylene glycol Compound | Average molecular weight | Amount of charge (wt. parts) | K & Na content (ppm) | Whiteness of polyester fiber |
|---|---|---|---|---|---|
| Comparative Example 7 | Phenoxypolyethylene glycol | 3000 | 6 | 6.0 | 58 |
| Comparative Example 8 | Phenoxypolyethylene glycol | 650 | 4 | 5.3 | 64 |

It is apparent from Table 1 that because the potassium and sodium content of charged polyalkylene glycol was invariably not more than 3 ppm, the resulting polyester fibers of Examples 1 through 8 had degrees of whiteness within the practically useful range of 77 to 82.

In contrast, because the potassium and sodium contents of the polyalkylene glycols used in Comparative Examples 1 through 8 were invariably over 3 ppm, the degrees of whiteness of the product polyesters were as low as 59 to 65, thus being unsuited for practical use.

EXAMPLES 9 Through 16 and Comparative EXAMPLES 9 through 16

A reactor equipped with agitator and reflux condenser was charged with 100 weight parts of dimethyl terephthalate, 98 weight parts of ethylene glycol, a predetermined amount of one of various polyalkylene glycols mentioned in Table 2, 0.06 weight part of pentaerythritol, 0.5 weight part of titanium dioxide and 0.05 weight part of antimony trioxide and the mixture was heated at 197° C with stirring in a nitrogen gas stream for ester exchange reaction. Thereafter, the reflux condensor was disconnected from the reactor and the temperature was increased to 285° C. for removal of excess ethylene glycol. The reaction mixture was stirred for 3 hours at the same temperature in a vacuum of 1 mmHg or less for polymerization.

The polymer thus obtained was withdrawn from the reactor, cooled to solidify, and fed to a melt spinning apparatus, from which it was extruded through a 48-orifice nozzle having an orifice diameter of 0.24 mm. The resulting tow was taken up and stretched in a water bath at 80° C. to give a polyester fiber of 250 D/48.

The measured degree of whiteness of this fiber is shown in Table 2.

The potassium and sodium content of polyalkylene glycol used and the degree of whiteness of the product polyester were determined by the methods described hereinbefore.

TABLE 2

| Item No. | Polyalkylene glycol Compound | Average molecular weight | Amount of charge (wt. parts) | K & Na content (ppm) | Whiteness of polyester fiber |
|---|---|---|---|---|---|
| Example 9 | Polyethylene glycol | 3000 | 3 | 1.0 | 83 |
| Example 10 | Methoxypolyethylene glycol | 5000 | 3 | 2.3 | 78 |
| Example 11 | Methoxypolyethylene glycol | 1000 | 3 | 1.4 | 81 |
| Example 12 | Phenoxypolyethylene glycol | 3000 | 3 | 0.9 | 81 |
| Example 13 | Phenoxypolypropylene glycol | 8000 | 3 | 1.2 | 82 |
| Example 14 | Methoxypolybutylene glycol | 1000 | 3 | 0.9 | 79 |
| Example 15 | Phenoxypolyethylene glycol | 3000 | 6 | 1.2 | 80 |
| Example 16 | Phenoxypolyethylene glycol | 650 | 4 | 1.6 | 81 |
| Comparative Example 9 | Polyethylene glycol | 3000 | 3 | 4.2 | 65 |
| Comparative Example 10 | Methoxypolyethylene glycol | 5000 | 3 | 5.5 | 61 |
| Comparative Example 11 | Methoxypolyethylene glycol | 1000 | 3 | 4.7 | 61 |
| Comparative Example 12 | Phenoxypolyethylene glycol | 3000 | 3 | 5.6 | 58 |
| Comparative Example 13 | Phenoxypolyethylene glycol | 8000 | 3 | 6.0 | 60 |
| Comparative Example 14 | Methoxypolybutylene glycol | 1000 | 3 | 4.8 | 61 |
| Comparative Example 15 | Phenoxypolyethylene glycol | 3000 | 6 | 6.0 | 59 |
| Comparative Example 16 | Phenoxypolyethylene glycol | 650 | 4 | 5.3 | 65 |

It is apparent from Table 2 that because the potassium and sodium content of charged polyalkylene glycol was invariably not more than 3 ppm in Examples 9 to 16, the resulting polyester fibers had degrees of whiteness in the practically useful range of 78 to 83.

In contrast, because the potassium and sodium contents of charged polyalkylene glycols used in Comparative Examples were invariably over 3 ppm, the degrees of whiteness of the product polyester fibers were invariably as low as 58 to 65, thus being unsuited for practical use.

What is claimed is:

1. A method of producing a modified polyester at least 80 percent of whose repeating structural units are ethylene terephthalate units which comprises adding at least one polyalkylene glycol of the following general formula (I) which has a potassium and sodium content not more than 3 ppm and an average molecular weight not less than 400 to the reaction system for copolymerization.

$$R\text{—}O\text{—}(AO)_{\overline{m}}H \ldots \quad (I)$$

wherein R is a $C_{1-26}$ aliphatic or aromatic hydrocarbon group or a hydrogen atom; A is a $C_{2-4}$ alkylene or substituted alkylene group; m is an integer representing a degree of polymerization.

* * * * *